United States Patent [19]

Suzuki et al.

[11] Patent Number: 4,711,314
[45] Date of Patent: Dec. 8, 1987

[54] MULTI-RANGE LOAD CELL WEIGHING SCALE

[75] Inventors: Seiji Suzuki; Yoshihisa Nishiyama; Tohru Kitagawa, all of Shizuoka, Japan

[73] Assignee: Tokyo Electric Co., Ltd., Tokyo, Japan

[21] Appl. No.: 946,123

[22] Filed: Dec. 24, 1986

Related U.S. Application Data

[63] Continuation of Ser. No. 767,781, Aug. 20, 1985, abandoned.

[30] Foreign Application Priority Data

Aug. 20, 1984 [JP] Japan .................................. 59-173050

[51] Int. Cl.$^4$ .......................... G01G 23/14; G01G 3/14
[52] U.S. Cl. ..................................... 177/164; 177/211
[58] Field of Search .................. 177/164, 211, 229; 73/862.65

[56] References Cited

U.S. PATENT DOCUMENTS 4,037,675  7/1977  Storace et al. ...................... 177/229
4,307,787 12/1981  Raboud et al. .................. 177/211 X
4,375,243  3/1983  Doll ................................. 177/164 X
4,420,054 12/1983  Caris .............................. 177/229 X

FOREIGN PATENT DOCUMENTS 2087085  5/1982  United Kingdom ............. 73/862.65

Primary Examiner—George H. Miller, Jr.
Attorney, Agent, or Firm—Oblon, Fisher, Spivak, McClelland & Maier

[57] ABSTRACT

A multi-range load cell weighing scale includes a load receiving pan provided at the top of a casing, a high-range load cell disposed in the casing for a high range of weight determination, and a low-range load cell disposed in the casing for a low range of weight determination in a substantially horizontally juxtaposed relation to the high-range load cell. The low-range load cell has one end connected to one end of the high-range load cell. The other end of the high-range load cell is supported on the bottom of the casing, while the other end of the low-range load cell defines a load support on which the pan is supported. The load to be weighed bears on the two load cells simultaneously. The scale enables a wide range of highly accurate weight determination, despite its use of inexpensive load cells.

3 Claims, 4 Drawing Figures

MULTI-RANGE LOAD CELL WEIGHING SCALE

This application is a continuation of application Ser. No. 767,781 filed Aug. 20, 1985 abandoned.

BACKGROUND OF THE INVENTION

1. Field of the Invention:

This invention relates to a multi-range load cell weighing scale which ensures a high accuracy of weight determination over a wide weight range.

2. Description of the Prior Art:

There is known a multi-range load cell weighing scale which provides readings in different units depending on the load, as disclosed, for example, in U.S. Pat. No. 4,037,675. For example, there is a weighing scale which can measure a weight of 1 g to 30 kg and indicate each weight in a number of four figures. It is, for example, designed to indicate a weight up to 2.5 kg in a unit of grams and a weight of 2.5 to 30 kg in a unit of 10 grams. More specifically, it indicates a weight of 1.5 kg as 1500 (g) and a weight of 15 kg as 1500 (10 g).

This scale requires load cells which can measure a weight over a wide range of 1 g to 30 kg. There is, however, a specific range only within which each load cell is operative for highly accurate weight determination. A load cell which is operative for highly accurate weight determination over a relatively wide range provides an accurate scale, but is expensive. Even such an expensive load cell has its own limitation and loses its accuracy with a widening in weight range.

SUMMARY OF THE INVENTION

Under these circumstances, it is an object of this invention to provide a multi-range load cell weighing scale which employs inexpensive load cells for highly accurate weight determination over a wide range, and which is compact in construction.

This object is attained by a weighing scale which comprises a high-range load cell and a low-range load cell which is operative over a lower weight range than the highrange load cell, the load cells being substantially horizontally juxtaposed to each other in a casing, the high-range load cell having one end connected to one end of the lowrange load cell, the other end of one of the load cells being supported on a base at the bottom of the casing, while the other end of the other load cell supports a load receiving pan at the top of the casing.

DETAILED DESCRIPTION OF THE INVENTION

Figure 1:
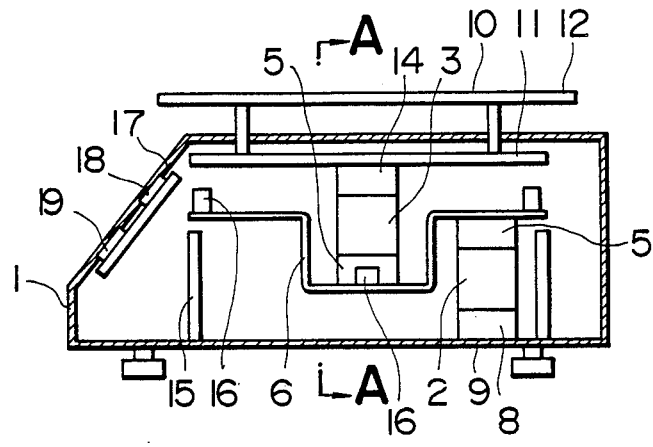
FIG. 1 is a side elevational view, partly in section, of a weighing scale embodying this invention.
Figure 2:
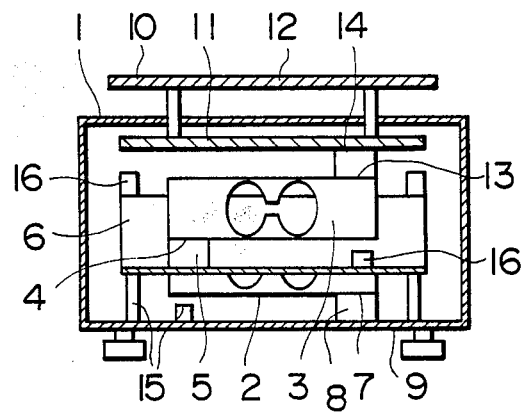
FIG. 2 is a sectional view talen along the line A-A' of FIG. 1.
Figure 3:
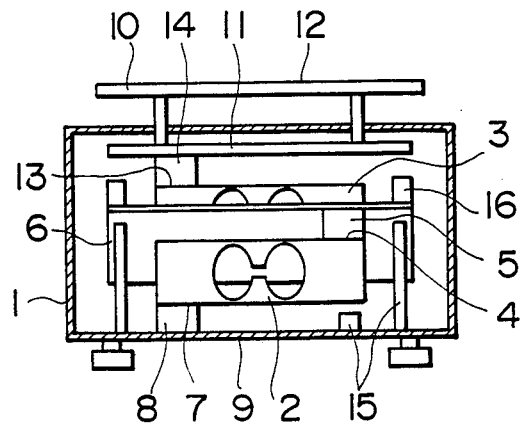
FIG. 3 is a rear elevational view, partly in section, of the scale shown in FIG. 1.

Referring to FIGS. 1 to 3, there is shown a weighing scale embodying this invention. It comprises a high-range load cell 2 formed from a hard material of low deflection and a low-range load cell 3 formed from a soft material of high deflection. The load cells 2 and 3 are substantially horizontally juxtaposed to each other in a casing 1. The load cell 2 has one end 4 connected to one end 4 of the load cell 3 by a connecting frame 6 and spacers 5 disposed between the ends 4, respectively, and the frame 6. The connecting frame 6 has a stepped shape which enables a stepwise connection between the load cells 2 and 3 to support them in a substantially horizontally juxtaposed relation to each other. The other end 7 of the high-range load cell 2, which is remote from one end 4 thereof, is supported by a spacer 8 on a base 9 defined by the bottom of the casing 1. The other end of the low-range load cell 3 defines a load support 13 which supports a load receiving pan 12 thereon by a spacer 14. The pan 12 comprises a load receiving plate 10 located above the top of the casing 1 and a frame 11 located within the casing 1 and connected to the plate 10.

The base 9 is provided thereon with a plurality of stop members 15 which face the bottom of the connecting frame 6 at the four corners thereof and also the bottom of the high-range load cell 2 in a spaced apart relation therefrom to protect the load cell 2 against failure or damage due to an overload. The connecting frame 6 is provided thereon with a plurality of stop members 16 which face the bottom of the frame 11 of the pan 12 at the four corners thereof and also the bottom of the low-range load cell 3 in a spaced apart relation therefrom to protect the load cell 3 against failure or damage due to an overload.

Figure 4:
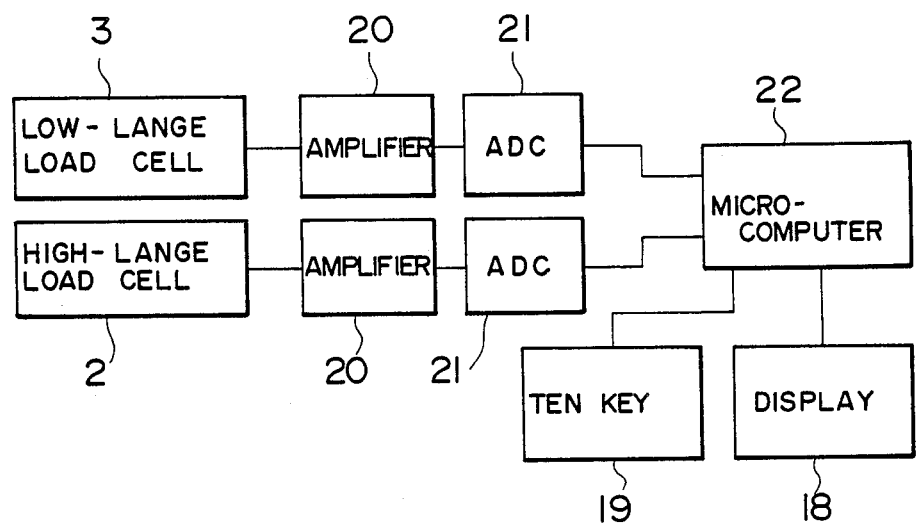
FIG. 4 is a block diagram showing an electrical circuit for the scale shown in FIG. 1.

A display board 17 is provided at the front end of the casing 1 and includes a display 18 and a ten-key 19 which are connected to the load cells 2 and 3 by an electrical circuit as shown in FIG. 4. The circuit includes an amplifier 20 and an analog-digital converter (ADC) 21 which are connected to the high-range load cell 2, and another amplifier 20 and another analog-digital converter 21 connected to the low-range load cell 3. The two analog-digital converters 21 are connected to a microcomputer 22 to which the display 18 and the ten-key 19 are connected.

The high-range load cell 2 is operative for a high weight range, and the low-range load cell 3 for a low weight range. If a load is placed on the pan 12, its weight is transmitted from the pan 12 to the load support 13, the end 4 of the low-range load cell 3, the connecting frame 6, the end 4 of the high-range load cell 2, and the other end 7 thereof in the order stated. The low-range load cell 3 and the high-range load cell 2 are deflected by the weight of the load and the amounts of their deflections are transmitted as electrical signals. The output signal of each load cell is amplified by the corresponding amplifier 20 and converted from analog to digital by the corresponding analog-digital converter 21, and the output of the converter 21 is transmitted to the microcomputer 22. The microcomputer 22 contains information which enables selection between the output signals of the load cells 2 and 3 by comparing the characteristics of the two load cells. Then, the output of the selected load cell appears on the display 18. The reading on the display 18 is automatically switched from one unit to the other depending on the weight of the load, i.e., depending on the selection made by the microcomputer 22.

In order to make a weighing scale which is easy to use and reliable, it is one of the important factors to ensure that the movement of the load to be weighed be reduced to a minimum. A weighing scale of the low height and flattened construction is, therefore, desirable. This is particularly the case with a scale for weighing heavy articles continuously. According to this invention, this desire or requirement is satisfied by the substantially horizontal juxtaposition of the two load cells on which a load is caused to bear simultaneously. Thus, this invention makes it possible to realize a weighing scale which is easy to use and reliable for highly accurate weight determination over a wide range, though the load cells per se may be inexpensive. The object of making a compact weighing scale essentially calls for a reduction in its height, since its width and length cannot usually be reduced to less than the corresponding dimensions of the load receiving pan. This requirement can easily be achieved, according to this invention, by the horizontal juxtaposition of the two load cells.

What is claimed is:

1. A multi-range load cell weighing scale comprising:
   a casing having a top and a bottom which defines a base;
   a load receiving pan provided at said top of said casing;
   a high-range load cell disposed in said casing for a high range of weight determination;
   a low-range load cell disposed in said casing for a low range of weight determination said low-range load cell being parallel to said high-range load cell in a horizontal direction, and overlapping said high-range load cell in a vertical direction, said low-range load cell having one end connected to one end of said high range load cell, another end of one of said load cells remote from said one end thereof being supported on said base, while another end of the other load cell defines a load support on which said pan is supported; and
   a frame for connecting said one end of said low-range load cell to said one end of said high-range load cell in a stepped fashion, and a plurality of stop members provided below said connecting frame.

2. A weighing scale as set forth in claim 1, wherein said pan comprises a load receiving plate located outside said top of said casing.

3. A weighing scale as set forth in claim 1, wherein said stop members provided below said frame of said pan are provided on said connecting frame.

* * * * *